United States Patent
Li

(10) Patent No.: US 11,751,140 B2
(45) Date of Patent: Sep. 5, 2023

(54) CHANNEL MONITORING METHODS AND APPARATUSES

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 173 days.

(21) Appl. No.: 17/310,537

(22) PCT Filed: Feb. 11, 2019

(86) PCT No.: PCT/CN2019/074807
§ 371 (c)(1),
(2) Date: Aug. 9, 2021

(87) PCT Pub. No.: WO2020/163985
PCT Pub. Date: Aug. 20, 2020

(65) Prior Publication Data
US 2022/0070778 A1    Mar. 3, 2022

(51) Int. Cl.
*H04W 52/02* (2009.01)
*H04W 74/00* (2009.01)
*H04W 74/08* (2009.01)

(52) U.S. Cl.
CPC ..... *H04W 52/0232* (2013.01); *H04W 74/006* (2013.01); *H04W 74/0841* (2013.01)

(58) Field of Classification Search
None
See application file for complete search history.

(56) References Cited

U.S. PATENT DOCUMENTS

| | | | |
|---|---|---|---|
| 8,929,319 B2 * | 1/2015 | Anderson | H04W 74/006 370/329 |
| 8,964,678 B2 * | 2/2015 | Anderson | H04W 72/04 370/329 |

(Continued)

FOREIGN PATENT DOCUMENTS

| | | |
|---|---|---|
| CN | 102932882 A | 2/2013 |
| CN | 108184263 A | 6/2018 |

(Continued)

OTHER PUBLICATIONS

Huawei, HiSilicon, "On configurations and procedures of power saving signal", 3GPP TSG RAN WGI Meeting #90bis, R1-1716985, Prague, Czech Republic, Oct. 9-13, 2017, 5 pages. (Year: 2017).*

(Continued)

*Primary Examiner* — Faiyazkhan Ghafoerkhan

(74) *Attorney, Agent, or Firm* — SYNCODA LLC; Feng Ma

(57) ABSTRACT

A channel monitoring method includes: configuring a specified occurrence of a power-saving signal and a specified effective time range of the specified occurrence for a terminal, the specified occurrence representing a specified effective range of the power-saving signal for subsequent discontinuous reception (DRX); generating first notification information, the first notification information comprising the specified occurrence and the specified effective time range; and sending the first notification information to the terminal, so that the terminal acquires the specified occurrence and the specified effective time range from the first notification information, and performs channel monitoring according to the specified occurrence and the specified effective time range.

19 Claims, 7 Drawing Sheets

(56) References Cited

U.S. PATENT DOCUMENTS

| | | | | |
|---|---|---|---|---|
| 8,964,679 | B2* | 2/2015 | Anderson | H04L 1/1812 |
| | | | | 370/329 |
| 8,989,122 | B2* | 3/2015 | Anderson | H04W 72/0446 |
| | | | | 370/329 |
| 9,088,971 | B2* | 7/2015 | Anderson | H04L 1/1607 |
| 9,247,563 | B2* | 1/2016 | Anderson | H04W 72/21 |
| 10,448,332 | B2* | 10/2019 | Lu | H04W 52/0229 |
| 10,588,171 | B2* | 3/2020 | Ang | H04W 52/0216 |
| 10,856,224 | B2* | 12/2020 | Nigam | H04W 52/0216 |
| 11,528,662 | B2* | 12/2022 | Liu | H04W 74/0808 |
| 11,533,682 | B2* | 12/2022 | Prasad | H04W 52/0232 |
| 11,546,853 | B2* | 1/2023 | Agiwal | H04W 76/27 |
| 11,553,433 | B2* | 1/2023 | Liu | H04W 52/0235 |
| 11,589,340 | B2* | 2/2023 | Takeda | H04W 72/23 |
| 11,595,922 | B2* | 2/2023 | Abedini | H04W 56/001 |
| 2008/0232310 | A1* | 9/2008 | Xu | H04W 52/0216 |
| | | | | 370/329 |
| 2017/0325167 | A1* | 11/2017 | Lu | H04W 52/0235 |
| 2017/0339641 | A1* | 11/2017 | Nigam | H04W 72/23 |
| 2018/0332655 | A1* | 11/2018 | Ang | H04W 52/0216 |
| 2022/0070778 | A1* | 3/2022 | Li | H04W 52/0235 |
| 2022/0408359 | A1* | 12/2022 | Hwang | H04W 4/80 |

FOREIGN PATENT DOCUMENTS

| | | | | |
|---|---|---|---|---|
| CN | 108696919 | A | 10/2018 | |
| CN | 108781415 | A | 11/2018 | |
| CN | 108924913 | A | 11/2018 | |
| CN | 109246803 | A | 1/2019 | |
| CN | 109286968 | A | 1/2019 | |
| CN | 109314869 | A | 2/2019 | |
| WO | 2008111684 | A1 | 9/2008 | |
| WO | WO-2008111684 | A1 * | 9/2008 | H04W 52/0216 |
| WO | 2016072787 | A1 | 5/2016 | |
| WO | WO-2016072787 | A1 * | 5/2016 | H04L 5/0096 |
| WO | 2018174635 | A1 | 9/2018 | |
| WO | 2018177052 | A1 | 10/2018 | |

OTHER PUBLICATIONS

State Intellectual Property Office of the People's Republic of China, Office Action and Search Report Issued in Application No. 201980000293.4, dated Dec. 27, 2021, 10 pages. (Submitted with Machine/Partial Translation).

European Patent Office, Extended European Search Report Issued in Application No. 19915125.9, dated Feb. 16, 2022, Germany, 13 pages.

ISA State Intellectual Property Office of the People's Republic of China, Written Opinion of the International Searching Authority Issued in Application No. PCT/CN2019/074807, dated Oct. 30, 2019, WIPO, 8 pages.

Huawei, HiSilicon, "On configurations and procedures of power saving signal", 3GPP TSG RAN WGI Meeting #90bis, R1-1716985, Prague, Czech Republic, Oct. 9-13, 2017, 5 pages.

Huawei, HiSilicon, Neul, "Power saving signal or channel in NB-IoT", 3GPP TSG-RAN WG2 Meeting #99, R2-1708301, Berlin, Germany, Aug. 21-25, 2017, 4 pages.

Panasonic,"Discussion on UE traffic adaptation and power consumption characteristics", 3GPP TSG-RAN WG1 Ad-Hoc Meeting 1901, R1-1901118, Taipei, Taiwan, Jan. 21-25, 2019, 7 pages.

Oppo, "On wake-up procedure for feNBIoT", 3GPP TSG RAN WG1 Meeting #93, R1-1806872, Busan, Korea, May 21-25, 2018, 4 pages.

InterDigital Inc.,"TP for DRX in NR-U", 3GPP TSG-RAN WG2 Meeting #104,R2-1816780, Spokane, U.S.A., Nov. 12-16, 2018, 3 pages.

State Intellectual Property Office of the People's Republic of China, Office Action and Search Report Issued in Application No. 2019800002934, dated May 19, 2021, 10 pages. (Submitted with Machine/Partial Translation).

ISA State Intellectual Property Office of the People's Republic of China, International Search Report Issued in Application No. PCT/CN2019/074807, dated Oct. 30, 2019, WIPO, 4 pages.

Intellectual property India, Office Action Issued in Application No. 202147040961, dated Apr. 25, 2022, 7 pages.

* cited by examiner

CHANNEL MONITORING METHODS AND APPARATUSES

CROSS-REFERENCE TO RELATED APPLICATION

The present application is a national stage of International Application No. PCT/CN2019/074807 filed on Feb. 11, 2019, the disclosure of which is hereby incorporated by reference in its entirety.

TECHNICAL FIELD

The present disclosure relates to the field of communication technologies, and more specifically to channel monitoring methods and apparatuses.

BACKGROUND

In the new generation of communication systems, power-saving signals are introduced, such as a wake up signaling (WUS). The WUS is a low-power detection signal.

In related art, if a terminal detects a WUS, it means that it is to perform physical downlink control channel (PDCCH) monitoring; if the terminal detects no WUS, it is to skip the PDCCH monitoring.

However, in the existing discontinuous reception (DRX) mechanism, there is no optimized solution for coordinated operation of a power-saving signal pattern and a DRX pattern.

SUMMARY

In order to overcome the problems in the related art, the embodiments of the present disclosure provide channel monitoring methods and apparatuses.

According to a first aspect of the embodiments of the present disclosure, provided is a channel monitoring method applied to a base station, including:
configuring a specified occurrence of a power-saving signal and a specified effective time range of the specified occurrence for a terminal, the specified occurrence representing a specified effective range of the power-saving signal for subsequent discontinuous reception (DRX);
generating first notification information, the first notification information including the specified occurrence and the specified effective time range; and
sending the first notification information to the terminal, so that the terminal acquires the specified occurrence and the specified effective time range from the first notification information, and performs channel monitoring according to the specified occurrence and the specified effective time range.

In some embodiments, the power-saving signal is a wake up signaling (WUS); and the specified occurrence is 0, which indicates that a WUS monitoring pattern is ignored and only a DRX pattern is used.

In some embodiments, the power-saving signal is a wake up signaling (WUS); and the specified occurrence is 1, which indicates that the WUS is only effective for one DRX wake-up period that follows the WUS.

In some embodiments, the power-saving signal is a wake up signaling (WUS); and the specified occurrence is an integer N greater than 1, which indicates that the WUS is effective for all N consecutive DRX wake-up periods that follow the WUS.

In some embodiments, the specified effective time range includes at least one of:
absolute time T;
a DRX short cycle period;
a first multiple of the DRX short cycle period;
a second multiple of a DRX long cycle period; or
until next time second notification information is received from a network, the second notification information including another specified occurrence and another specified effective time range configured by the base station for the terminal.

In some embodiments, sending the first notification information to the terminal includes:
adding the first notification information to a specified signaling; and
sending the specified signaling to the terminal, so that the terminal acquires the first notification information from the specified signaling.

In some embodiments, the specified signaling includes at least one of:
a downlink control information (DCI) signaling;
a random access response (RAR) signaling in a random access process;
a contention resolution (CR) signaling in a random access process;
a radio resource control (RRC) signaling; or
a media access control address control element (MAC CE) signaling In some embodiments, the method further includes:
determining a default occurrence of the power-saving signal, the default occurrence representing a default effective range of the power-saving signal for subsequent discontinuous reception (DRX); and
sending the default occurrence to the terminal through a system message or a radio resource control (RRC) message, so that the terminal performs channel monitoring according to the default occurrence after the specified effective time range expires.

In some embodiments, the default occurrence is 1 or an integer greater than 1.

According to a second aspect of the embodiments of the present disclosure, provided is a channel monitoring method applied to a terminal, including:
receiving first notification information sent by a base station, the first notification information including a specified occurrence of a power-saving signal and a specified effective time range of the specified occurrence configured by the base station for the terminal, and the specified occurrence representing a specified effective range of the power-saving signal for subsequent discontinuous reception (DRX);
acquiring the specified occurrence and the specified effective time range from the first notification information; and
performing channel monitoring according to the specified occurrence and the specified effective time range.

In some embodiments, the power-saving signal is a wake up signaling (WUS); the specified occurrence is 0, which indicates that a WUS monitoring pattern is ignored and only a DRX pattern is used; and
performing the channel monitoring according to the specified occurrence and the specified effective time range includes:
within the specified effective time range, ignoring a WUS monitoring pattern and using only a DRX pattern.

In some embodiments, the power-saving signal is a wake up signaling (WUS); the specified occurrence is 1, which indicates that the WUS is only effective for one DRX wake-up period that follows the WUS; and performing the channel monitoring according to the specified occurrence and the specified effective time range includes:

within the specified effective time range, in response to that the WUS is detected, performing channel monitoring only during one DRX wake-up period that follows the WUS; in response to that the WUS is not detected, performing no channel monitoring during one DRX wake-up period that follows the WUS.

In some embodiments, the power-saving signal is a wake up signaling (WUS); the specified occurrence is an integer N greater than 1, which indicates that the WUS is effective for all N consecutive DRX wake-up periods that follow the WUS; and performing the channel monitoring according to the specified occurrence and the specified effective time range includes:

within the specified effective time range, in response to that the WUS is detected, performing channel monitoring during all N consecutive DRX wake-up periods that follow the WUS; in response to that the WUS is not detected, performing no channel monitoring during all N consecutive DRX wake-up periods that follow the WUS.

In some embodiments, the specified effective time range includes at least one of:

absolute time T;
a DRX short cycle period;
a first multiple of the DRX short cycle period;
a second multiple of a DRX long cycle period; or
until next time second notification information is received from a network, the second notification information including another specified occurrence and another specified effective time range configured by the base station for the terminal In some embodiments, receiving the first notification information sent by the base station includes:

receiving a specified signaling sent by the base station, the specified signaling including the first notification information; and
acquiring the first notification information from the specified signaling.

In some embodiments, the specified signaling includes at least one of:

a DCI signaling;
an RAR signaling in a random access process;
a CR signaling in a random access process;
an RRC signaling; or
an MAC CE signaling.

In some embodiments, the method further includes:

after the specified effective time range expires, performing channel monitoring according to a default occurrence.

In some embodiments, the default occurrence is sent by the base station to the terminal through a system message or an RRC message, or specified by a communication protocol.

According to a third aspect of the embodiments of the present disclosure, provided is a channel monitoring apparatus applied to a base station, including:

a configuration module, configured to configure a specified occurrence of a power-saving signal and a specified effective time range of the specified occurrence for a terminal, the specified occurrence representing a specified effective range of the power-saving signal for subsequent discontinuous reception (DRX);

a generation module, configured to generate first notification information, the first notification information including the specified occurrence and the specified effective time range; and a first sending module, configured to send the first notification information to the terminal, so that the terminal acquires the specified occurrence and the specified effective time range from the first notification information, and performs channel monitoring according to the specified occurrence and the specified effective time range.

In some embodiments, the power-saving signal is a wake up signaling (WUS); and the specified occurrence is 0, which indicates that a WUS monitoring pattern is ignored and only a DRX pattern is used.

In some embodiments, the power-saving signal is a wake up signaling (WUS); and the specified occurrence is 1, which indicates that the WUS is only effective for one DRX wake-up period that follows the WUS.

In some embodiments, the power-saving signal is a wake up signaling (WUS); and the specified occurrence is an integer N greater than 1, which indicates that the WUS is effective for all N consecutive DRX wake-up periods that follow the WUS.

In some embodiments, the specified effective time range includes at least one of:

absolute time T;
a DRX short cycle period;
a first multiple of the DRX short cycle period;
a second multiple of a DRX long cycle period; or
until next time second notification information is received from a network, the second notification information including another specified occurrence and another specified effective time range configured by the base station for the terminal.

In some embodiments, the first sending module includes:

an adding submodule, configured to add the first notification information to a specified signaling; and
a sending submodule, configured to send the specified signaling to the terminal, so that the terminal acquires the first notification information from the specified signaling.

In some embodiments, the specified signaling includes at least one of:

a DCI signaling;
an RAR signaling in a random access process;
a CR signaling in a random access process;
an RRC signaling; or
an MAC CE signaling.

In some embodiments, the apparatus further includes:

a determination module, configured to determine a default occurrence of the power-saving signal, the default occurrence representing a default effective range of the power-saving signal for subsequent discontinuous reception (DRX); and
a second sending module, configured to send the default occurrence to the terminal through a system message or a radio resource control (RRC) message, so that the terminal performs channel monitoring according to the default occurrence after the specified effective time range expires.

In some embodiments, the default occurrence is 1 or an integer greater than 1. According to a fourth aspect of the embodiments of the present disclosure, provided is a channel monitoring apparatus applied to a terminal, including:

a reception module, configured to receive first notification information sent by a base station, the first notification information including a specified occurrence of a power-saving signal and a specified effective time range of the specified occurrence configured by the base station for the terminal, and the specified occurrence representing a specified effective range of the power-saving signal for subsequent discontinuous reception (DRX);

an acquisition module, configured to acquire the specified occurrence and the specified effective time range from the first notification information; and a first channel monitoring module, configured to perform channel monitoring according to the specified occurrence and the specified effective time range.

In some embodiments, the power-saving signal is a wake up signaling (WUS); the specified occurrence is 0, which indicates that a WUS monitoring pattern is ignored and only a DRX pattern is used; and the first channel monitoring module includes:

a first monitoring submodule, configured to, within the specified effective time range, ignore a WUS monitoring pattern and use only a DRX pattern.

In some embodiments, the power-saving signal is a wake up signaling (WUS); the specified occurrence is 1, which indicates that the WUS is only effective for one DRX wake-up period that follows the WUS; and the first channel monitoring module includes:

a second monitoring submodule, configured to, within the specified effective time range, in response to that the WUS is detected, perform channel monitoring only during one DRX wake-up period that follows the WUS; in response to that the WUS is not detected, perform no channel monitoring during one DRX wake-up period that follows the WUS In some embodiments, the power-saving signal is a wake up signaling (WUS); the specified occurrence is an integer N greater than 1, which indicates that the WUS is effective for all N consecutive DRX wake-up periods that follow the WUS; and the first channel monitoring module includes:

a third monitoring submodule, configured to, within the specified effective time range, in response to that the WUS is detected, perform channel monitoring during all N consecutive DRX wake-up periods that follow the WUS; in response to that the WUS is not detected, perform no channel monitoring during all N consecutive DRX wake-up periods that follow the WUS.

In some embodiments, the specified effective time range includes at least one of:

absolute time T;
a DRX short cycle period;
a first multiple of the DRX short cycle period;
a second multiple of a DRX long cycle period; or
until next time second notification information is received from a network, the second notification information including another specified occurrence and another specified effective time range configured by the base station for the terminal.

In some embodiments, the reception module includes:

a reception submodule, configured to receive a specified signaling sent by the base station, the specified signaling including the first notification information; and an acquisition submodule, configured to acquire the first notification information from the specified signaling In some embodiments, the specified signaling includes at least one of:

a DCI signaling;
an RAR signaling in a random access process;
a CR signaling in a random access process;
an RRC signaling; or
an MAC CE signaling.

In some embodiments, the apparatus further includes:

a second channel monitoring module, configured to, after the specified effective time range expires, perform channel monitoring according to a default occurrence.

In some embodiments, the default occurrence is sent by the base station to the terminal through a system message or a radio resource control (RRC) message, or specified by a communication protocol.

According to a fifth aspect of the embodiments of the present disclosure, provided is a non-transitory computer readable storage medium storing computer programs, where the computer programs are used to perform the channel monitoring method according to the first aspect.

According to a sixth aspect of the embodiments of the present disclosure, provided is a non-transitory computer readable storage medium storing computer programs, where the computer programs are used to perform the channel monitoring method according to the second aspect.

According to a seventh aspect of the embodiments of the present disclosure, provided is a channel monitoring apparatus applied to a base station, including:

a processor; and
a memory for storing instructions executable by the processor,
where the processor is configured to:
configure a specified occurrence of a power-saving signal and a specified effective time range of the specified occurrence for a terminal, the specified occurrence representing a specified effective range of the power-saving signal for subsequent discontinuous reception (DRX);
generate first notification information, the first notification information including the specified occurrence and the specified effective time range; and
send the first notification information to the terminal, so that the terminal acquires the specified occurrence and the specified effective time range from the first notification information, and performs channel monitoring according to the specified occurrence and the specified effective time range. According to an eighth aspect of the embodiments of the present disclosure, provided is a channel monitoring apparatus applied to a terminal, including:
a memory for storing instructions executable by the processor,
where the processor is configured to:
a processor; and
a memory for storing instructions executable by the processor,
where the processor is configured to:
receive first notification information sent by a base station, the first notification information including a specified occurrence of a power-saving signal and a specified effective time range of the specified occurrence configured by the base station for the terminal, and the specified occurrence representing a specified effective range of the power-saving signal for subsequent discontinuous reception (DRX);
acquire the specified occurrence and the specified effective time range from the first notification information; and
perform channel monitoring according to the specified occurrence and the specified effective time range. The technical solutions provided by the embodiments of the present disclosure may include the following beneficial effects.

It can be seen from the above embodiment that a specified occurrence of a power-saving signal and a specified effective time range of the specified occurrence is configured for a terminal, the specified occurrence representing a specified effective range of the power-saving signal for subsequent DRX; first notification information is generated, the first notification information including the specified occurrence and the specified effective time range; and the first notification information is sent to the terminal. In this way, the terminal can acquire the specified occurrence and the specified effective time range from the first notification information, and perform channel monitoring according to the specified occurrence and the specified effective time range, thereby realizing coordinated operation of a power-saving signal pattern and a DRX pattern. If there is data, a base station can instruct the terminal to monitor intensively, through the specified occurrence; if there is no data, the base station can instruct the terminal to monitor sparsely, through the specified occurrence, which improves efficiency of channel monitoring and also avoids resource waste.

It can be seen from the above embodiment that first notification information sent by a base station is received. The first notification information includes a specified occurrence of a power-saving signal and a specified effective time range of the specified occurrence configured by the base station for the terminal, and the specified occurrence represents a specified effective range of the power-saving signal for subsequent DRX. The specified occurrence and the specified effective time range are acquired from the first notification information. Channel monitoring is performed according to the specified occurrence and the specified effective time range. In this way, coordinated operation of a power-saving signal pattern and a DRX pattern is realized. If there is data, the terminal may monitor intensively according to the specified occurrence; if there is no data, the terminal may monitor sparsely according to the specified occurrence, thereby improving efficiency of channel monitoring and also avoids resource waste.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
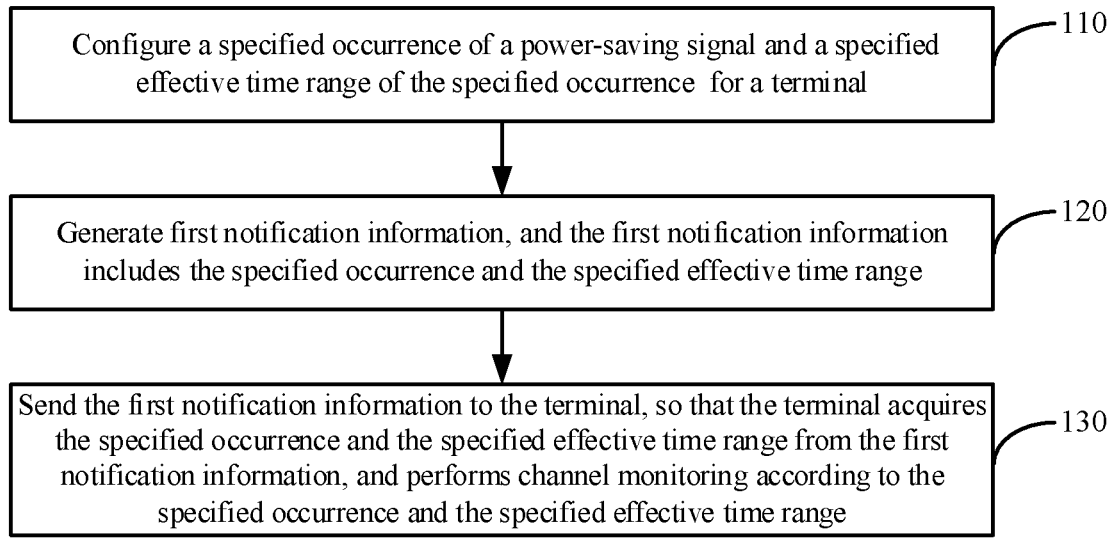
FIG. 1 is a flowchart illustrating a channel monitoring method according to an exemplary embodiment.

Exemplary embodiments will be described in detail herein, with the illustrations thereof represented in the drawings. When the following descriptions involve the drawings, like numerals in different drawings refer to like or similar elements unless otherwise indicated. The implementation described in the following exemplary embodiments do not represent all embodiments consistent with the present disclosure. Rather, they are merely examples of apparatuses and methods consistent with some aspects of the present disclosure as detailed in the appended claims.

The terms used in the present disclosure are only for the purpose of describing specific examples and are not intended to limit the present disclosure. The singular forms "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", etc. may be used in this disclosure to describe various information, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used herein may be interpreted as "on the condition that" or "when" or "in response to determining".

Figure 2:
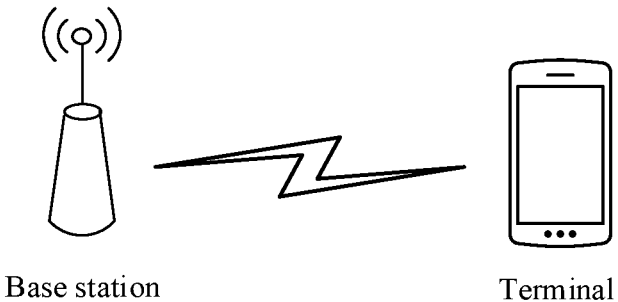
FIG. 2 is a diagram illustrating an application scenario of a channel monitoring method according to an exemplary embodiment.

FIG. 1 is a flowchart of a channel monitoring method according to an exemplary embodiment, and FIG. 2 is a diagram illustrating an application scenario of a channel monitoring method according to an exemplary embodiment;

the channel monitoring method can be applied to a base station, as shown in FIG. 1, the channel monitoring method may include the following steps 110 to 130.

At step 110, a specified occurrence of a power-saving signal and a specified effective time range of the specified occurrence are configured for a terminal. The specified occurrence represents a specified effective range of the power-saving signal for subsequent discontinuous reception (DRX).

In the embodiments of the present disclosure, DRX refers to that a terminal stops monitoring a channel for a period of time, so as to achieve the purpose of power saving.

In an embodiment, the power-saving signal at step 110 may be a wake up signaling (WUS). In addition, in a scenario with DRX configured, it is usually configured that the WUS is before a DRX wake-up period (i.e., on duration). If a terminal detects the WUS, it means that it is to perform channel monitoring during a subsequent DRX wake-up period, for example, physical downlink control channel (PDCCH) monitoring; if the terminal detects no WUS, the subsequent DRX wake-up period (i.e., on duration) is to be skipped, that is, no channel monitoring is to be performed for the subsequent DRX wake-up period. As for how many DRX wake-up periods are to be skipped, this is determined by a specified occurrence configured by a base station for the terminal.

In an embodiment, the specified occurrence at step 110 may be 0, that is, a WUS monitoring pattern is ignored and only a DRX pattern is used.

In this way, a WUS is noneffective for a DRX wake-up period (i.e. on duration) that follows the WUS, that is, the WUS monitoring pattern is completely ignored and only the DRX pattern is used.

For example, for a non-real-time service such as world wide web (web) browsing, a home page is first downloaded, then a series of small objects are downloaded, and the network is to continuously send downstream data. In this case, monitoring of the WUS is not necessary, and the use of a WUS instead increases the overhead in order to monitor the WUS. Therefore, the base station can configure the specified occurrence to 0, that is, the WUS monitoring pattern is completely ignored and only the DRX pattern is used.

In an embodiment, the specified occurrence at step 110 may be 1, that is, the WUS is only effective for one DRX wake-up period that follows the WUS.

In this way, the WUS is effective for the DRX wake-up period that follows the WUS, that is, if the terminal detects one WUS, channel monitoring is performed during the DRX wake-up period that follows the WUS; otherwise, the DRX wake-up period is to be skipped.

In an embodiment, the specified occurrence at step 110 may be an integer N greater than 1, that is, the WUS is effective for all N consecutive DRX wake-up periods that follow the WUS. For example: N equals to 5.

In this way, a WUS is effective for N consecutive DRX wake-up periods that follow the WUS, that is, if the terminal detects one WUS, channel monitoring is performed during the N consecutive DRX wake-up periods that follow the WUS; otherwise, the N consecutive DRX wake-up periods are skipped.

In an embodiment, the specified effective time range at step 110 may include, but is not limited to, at least one of:
(1-1) absolute time T;
(1-2) a DRX short cycle period;
(1-3) a first multiple of the DRX short cycle period;
(1-4) a second multiple of a DRX long cycle period; or
(1-5) until next time second notification information is received from the network, the second notification information includes another specified occurrence and another specified effective time range configured by the base station for the terminal.

In the embodiments of the present disclosure, during a DRX wake-up period (i.e., on duration), a terminal is to start an inactivity timer every time it receives a new grant, and after the inactivity timer expires, if a short circle is configured, the terminal enters the short cycle, otherwise, it enters a long cycle.

The first multiple in the above (1-3) can be an integer M, and its value can be the same as the specified occurrence configured by the base station for the terminal, which means that an effective period lasts for one power-saving signal effective circle; the second multiple in the above (1-4) can be an integer L, and its value can also be the same as the specified occurrence configured by the base station for the terminal, which means that the effective period lasts for one power-saving signal effective circle.

At step 120, first notification information is generated, and the first notification information includes the specified occurrence and the specified effective time range.

In the embodiments of the present disclosure, the base station may notify the terminal of the specified occurrence and the specified effective time range configured for the terminal through first notification information.

At step 130, the first notification information is sent to the terminal, so that the terminal acquires the specified occurrence and the specified effective time range from the first notification information, and performs channel monitoring according to the specified occurrence and the specified effective time range.

In an embodiment, when step 130 is performed, the first notification information may be sent to the terminal through a specified signaling, which includes:
(2-1) adding the first notification information to the specified signaling; and
(2-2) sending the specified signaling to the terminal, so that the terminal acquires the first notification information from the specified signaling.

In an embodiment, the specified signaling in the above (2-1) may include, but is not limited to, at least one of:
(3-1) a downlink control information (DCI) signaling;
(3-2) a random access response (RAR) signaling in a random access process;
(3-3) a contention resolution (CR) signaling in the random access process;
(3-4) a radio resource control (RRC) signaling; or
(3-5) a media access control address control element (MAC CE) signaling.

In an example scenario, as shown in FIG. 2, a base station and a terminal are included. The base station may configure a specified occurrence of a power-saving signal and a specified effective time range of the specified occurrence for the terminal, where the specified occurrence represents a specified effective range of the power-saving signal for subsequent discontinuous reception (DRX); the base station may generate first notification information, where the first notification information includes the specified occurrence and the specified effective time range; and the base station may send the specified occurrence and the specified effective time range to the terminal, so that the terminal acquires the specified occurrence and the specified effective time range from the first notification information, and performs channel monitoring according to the specified occurrence and the specified effective time range.

For example, in a case that the terminal and the base station are synchronized, when a large amount of downlink data accumulates, the base station can notify, in a grant indicator of a first newly transmitted data packet, that during a subsequent short circle period, the occurrence of a power-saving signal skipping DRX wake-up period (skip on duration) is adjusted from N to N1 until a DRX wake-up period (on duration) of a next long cycle is coming. N is a default occurrence (for example, as agreed in a protocol), N1 is a specified occurrence configured by the base station for the terminal, and the short cycle period is a specified effective time range configured by the base station for the terminal. The grant indicator of the first newly-transmitted data packet is a signaling used to transmit the specified occurrence and the specified effective time range.

For another example, in a case that the terminal and the base station are not synchronized, when a large amount of downlink data accumulates, the base station can first notify the terminal to initiate random access through a PDCCH command. The PDCCH command is used to notify that during a subsequent short cycle period, the occurrence of the power-saving signal skipping DRX wake-up period (skip on duration) is adjusted from N to N1 until a DRX wake-up period (on duration) of a next long cycle is coming. N is a default occurrence (for example, as agreed in a protocol), N1 is a specified occurrence configured by the base station for the terminal, and the short cycle period is a specified effective time range configured by the base station for the terminal. The PDCCH command notifying the terminal to initiate random access is a signaling used to transmit the specified occurrence and the specified effective time range.

For another example, in a case that the terminal and the base station are not synchronized, when a large amount of downlink data accumulates, the base station can first notify the terminal to initiate random access through a PDCCH command. For a contention-free pattern, a RAR signaling is used to notify that during a subsequent short cycle period, the occurrence of the power-saving signal skipping DRX wake-up period (skip on duration) is adjusted from N to N1 until a DRX wake-up period (on duration) of a next long cycle is coming. N is a default occurrence (for example, as agreed in a protocol), N1 is a specified occurrence configured by the base station for the terminal, and the short cycle period is a specified effective time range configured by the base station for the terminal. The RAR signaling is a signaling used to transmit the specified occurrence and the specified effective time range.

For another example, in a case that the terminal and the base station are not synchronized, when a large amount of downlink data accumulates, the base station can firstly notify the terminal to initiate random access through a PDCCH command. For a contention-based pattern, a CR signaling is used to notify that during a subsequent short cycle period, the occurrence of the power-saving signal skipping DRX wake-up period (skip on duration) is adjusted from N to N1 until a DRX wake-up period (on duration) of a next long cycle is coming. N is a default occurrence (for example, as agreed in a protocol), N1 is a specified occurrence configured by the base station for the terminal, and the short cycle period is a specified effective time range configured by the base station for the terminal. The CR signaling is a signaling used to transmit the specified occurrence and the specified effective time range.

For another example, when a large amount of uplink data accumulates, if the terminal is out of synchronization and random access is initiated, the base station notifies, in a CR signaling, that during the subsequent short cycle period, the occurrence of the power-saving signal skipping DRX wake-up period (skip on duration) is adjusted from N to N1 until a DRX wake-up period (on duration) of a next long cycle is coming. N is a default occurrence (for example, as agreed in a protocol), N1 is a specified occurrence configured by the base station for the terminal, and the short cycle period is a specified effective time range configured by the base station for the terminal. The CR signaling is a signaling used to transmit the specified occurrence and the specified effective time range.

For another example, when a large amount of uplink data accumulates, if the terminal is in synchronization, the base station can notify, in a grant indicator responding to a buffer status report (BSR), that during a subsequent short cycle period, the occurrence of the power-saving signal skipping DRX wake-up period (skip on duration) is adjusted from N to N1 until a DRX wake-up period (on duration) of a next long cycle is coming. N is a default occurrence (for example, as agreed in a protocol), N1 is a specified occurrence configured by the base station for the terminal, and the short cycle period is a specified effective time range configured by the base station for the terminal. The grant indicator responding to the BSR is a signaling used to transmit the specified occurrence and the specified effective time range.

For another example, when channel quality of a terminal is poor or a base station receives a measurement report of the terminal, the base station can notify, in a grant indicator of a newly transmitted data packet, that during a subsequent short circle period, the occurrence of a power-saving signal skipping DRX wake-up period (skip on duration) is adjusted from N to N1 until a DRX wake-up period (on duration) of a next long cycle is coming. This facilitates timely sending of possible subsequent switching commands. N is a default occurrence (for example, as agreed in a protocol), N1 is a specified occurrence configured by the base station for the terminal, and the short cycle period is a specified effective time range configured by the base station for the terminal. The grant indicator of the newly-transmitted data packet is a signaling used to transmit the specified occurrence and the specified effective time range.

For another example, N1 is configured as 0, that is, the monitoring pattern of the power-saving signal is completely ignored. N1 is a specified occurrence configured by the base station for the terminal.

For another example, if there is no uplink data transmission and the terminal in synchronization, the base station can notify, in a grant indicator responding to a buffer status report (BSR) indicating there is no buffer data, that the default occurrence of a power-saving signal skipping DRX wake-up period (skip on duration) is adjusted from N to N2. N2>N, that is, a power-saving signal monitoring pattern with a larger interval is adopted. N is a default occurrence (for example, as agreed in a protocol), and N2 is another specified occurrence configured by the base station for the terminal.

For another example, when downlink data transmission is to be completed and the terminal is in synchronization, the base station can notify, in a MAC CE signaling, that the default occurrence of a power-saving signal skipping DRX wake-up period (skip on duration) is adjusted from N to N2. N2>N, that is, a power-saving signal monitoring pattern with a larger interval is adopted. N is a default occurrence (for example, as agreed in a protocol), and N2 is another specified occurrence configured by the base station for the terminal.

For another example, the base station may notify the terminal in advance through an RRC signaling that N1 is configured as 0 during a short circle period, that is, the power-saving signal monitoring pattern is completely ignored. N1 is a specified occurrence configured by the base station for the terminal.

For another example, the base station may notify the terminal in advance through an RRC signaling that N1 is configured to be greater than a default value N during a short circle period, that is, a power-saving signal monitoring pattern with a larger interval is adopted. N1 is a specified occurrence configured by the base station for the terminal.

It can be seen from the above embodiment that a specified occurrence of a power-saving signal and a specified effective time range of the specified occurrence is configured for a terminal, the specified occurrence representing a specified effective range of the power-saving signal for subsequent DRX; first notification information is generated, the first notification information including the specified occurrence and the specified effective time range; and the first notification information is sent to the terminal. In this way, the terminal can acquire the specified occurrence and the specified effective time range from the first notification information, and perform channel monitoring according to the specified occurrence and the specified effective time range, thereby realizing coordinated operation of a power-saving signal pattern and a DRX pattern. If there is data, a base station can instruct the terminal to monitor intensively, through the specified occurrence; if there is no data, the base station can instruct the terminal to monitor sparsely, through the specified occurrence, which improves efficiency of channel monitoring and also avoids resource waste.

Figure 3:
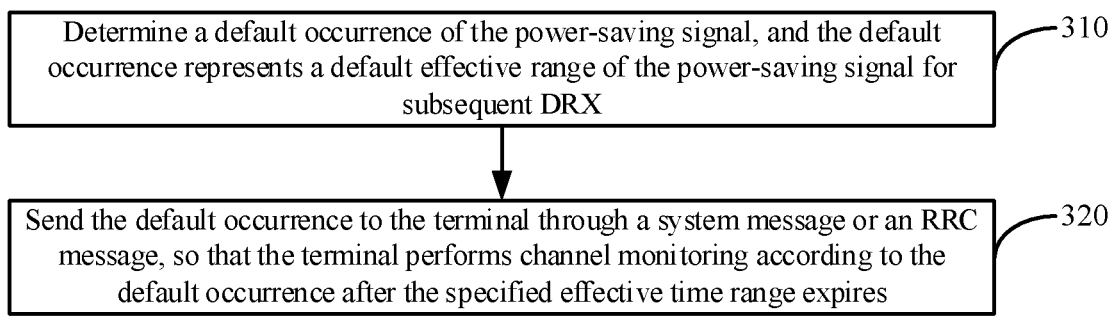
FIG. 3 is a flowchart illustrating another channel monitoring method according to an exemplary embodiment.

FIG. 3 is a flowchart illustrating another channel monitoring method according to an exemplary embodiment and the channel monitoring method can be applied to a base station. On the basis of the method shown in FIG. 1, as shown in FIG. 3, step 120, when performed, may include the following steps 310 and 320.

At step 310, a default occurrence of the power-saving signal is determined, and the default occurrence represents a default effective range of the power-saving signal for subsequent DRX.

In the embodiments of the present disclosure, the default occurrence may be pre-agreed by the base station and the terminal, or may be specified by a communication protocol.

At step 320, the default occurrence is sent to the terminal through a system message or an RRC message, so that the terminal performs channel monitoring according to the default occurrence after the specified effective time range expires.

In the embodiments of the present disclosure, the base station may notify the terminal of the default occurrence through a static mode such as a system message or an RRC message.

In an embodiment, the default occurrence at step 310 may be 1, or may be an integer greater than 1.

It can be seen from the above embodiment that a default occurrence of the power-saving signal is determined, and the default occurrence represents a default effective range of the power-saving signal for subsequent DRX. The default occurrence is sent to the terminal through a system message or an RRC message, so that the terminal may perform channel monitoring according to the default occurrence after the specified effective time range expires. In this way, implementation of channel monitoring is enriched, and reliability and utility of channel monitoring is also improved.

Figure 4:
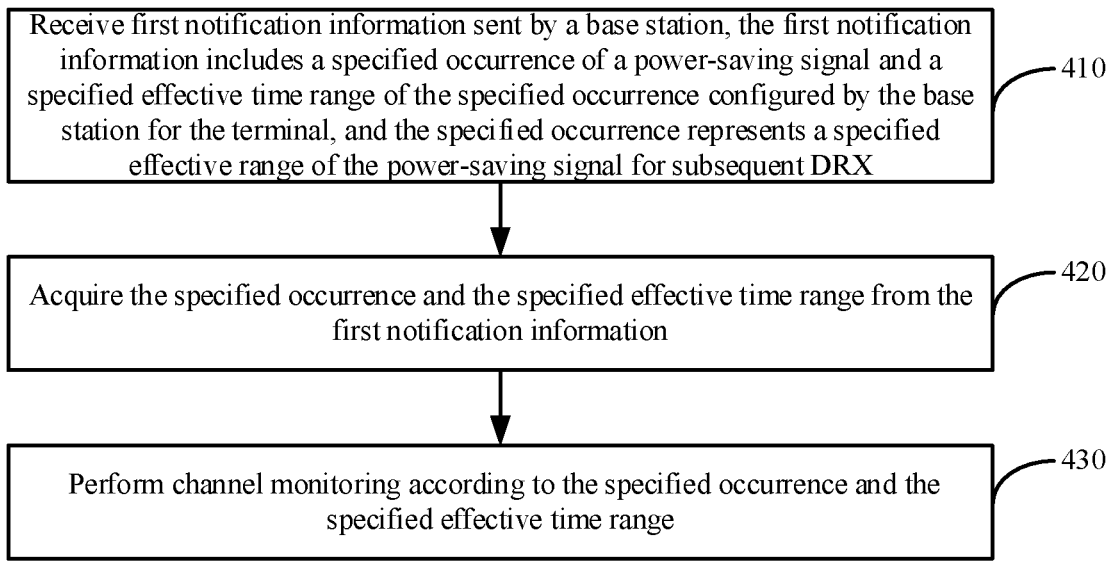
FIG. 4 is a flowchart illustrating another channel monitoring method according to an exemplary embodiment.

FIG. 4 is a flowchart illustrating a channel monitoring method according to an exemplary embodiment. The channel monitoring method may be applied to a terminal. As shown in FIG. 4, the channel monitoring method may include the following steps 410 to 430.

At step 410, first notification information sent by a base station is received. The first notification information includes a specified occurrence of a power-saving signal and a specified effective time range of the specified occurrence configured by the base station for the terminal, and the specified occurrence represents a specified effective range of the power-saving signal for subsequent DRX.

In the embodiments of the present disclosure, discontinuous reception (DRX) refers to that a terminal stops monitoring a channel for a period of time, so as to achieve the purpose of power saving.

In an embodiment, the power-saving signal at step 410 may be a WUS. In addition, in a scenario with DRX configured, it is usually configured that the WUS is before a DRX wake-up period (i.e., on duration). If a terminal detects the WUS, it means that it is to perform channel monitoring during a subsequent DRX wake-up period, for example, physical downlink control channel (PDCCH) monitoring; if the terminal detects no WUS, the subsequent DRX wake-up period (i.e., on duration) is to be skipped, that is, no channel monitoring is to be performed for the subsequent DRX wake-up period. As for how many DRX wake-up periods are to be skipped, this is determined by a specified occurrence configured by a base station for the terminal.

In an embodiment, the specified occurrence at step 410 may be 0, that is, a WUS monitoring pattern is ignored and only a DRX pattern is used.

In this way, a WUS is noneffective for a DRX wake-up period (i.e., on duration) that follows the WUS, that is, the WUS monitoring pattern is completely ignored and only the DRX pattern is used.

In an embodiment, the specified occurrence at step 410 may be 1, that is, the WUS is only effective for one DRX wake-up period that follows the WUS.

In this way, the WUS is effective for the DRX wake-up period that follows the WUS, that is, if the terminal detects one WUS, channel monitoring is performed during the DRX wake-up period that follows the WUS; otherwise, the DRX wake-up period is to be skipped.

In an embodiment, the specified occurrence at step 410 may be an integer N greater than 1, that is, the WUS is effective for all N consecutive DRX wake-up periods that follow the WUS. For example: N equals to 5.

In this way, a WUS is effective for N consecutive DRX wake-up periods that follow the WUS, that is, if the terminal detects one WUS, channel monitoring is performed during the N consecutive DRX wake-up periods that follow the WUS; otherwise, the N consecutive DRX wake-up periods are skipped.

In an embodiment, the specified effective time range at step 410 may include, but is not limited to, at least one of:
 (4-1) absolute time T;
 (4-2) a DRX short cycle period;
 (4-3) a first multiple of the DRX short cycle period;
 (4-4) a second multiple of a DRX long cycle period; or
 (4-5) until next time second notification information is received from the network, the second notification information includes another specified occurrence and another specified effective time range configured by the base station for the terminal.

In the embodiments of the present disclosure, during a DRX wake-up period (i.e., on duration), a terminal is to start an inactivity timer every time it receives a new grant, and after the inactivity timer expires, if a short circle is configured, the terminal enters the short cycle, otherwise, it enters a long cycle.

The first multiple in the above (4-3) can be an integer M, and its value can be the same as the specified occurrence configured by the base station for the terminal, which means that an effective period lasts for one power-saving signal effective circle; the second multiple in the above (4-4) can be an integer L, and its value can also be the same as the specified occurrence configured by the base station for the terminal, which means that the effective period lasts for one power-saving signal effective circle.

At step 420, the specified occurrence and the specified effective time range are acquired from the first notification information.

At step 430, channel monitoring is performed according to the specified occurrence and the specified effective time range.

In the embodiments of the present disclosure, within the specified effective time range, channel monitoring can be performed at a specified occurrence.

In an embodiment, the power-saving signal is a WUS; the specified occurrence is 0, which indicates that a WUS monitoring pattern is ignored and only a DRX pattern is used; when step 430 is performed, within the specified effective time range, the WUS monitoring pattern may be ignored and only the DRX pattern may be used.

In an embodiment, the power-saving signal is a WUS; the specified occurrence is 1, which indicates that the WUS is only effective for one DRX cycle that follows the WUS; when step 430 is performed, within the specified effective time range, if the WUS is detected, channel monitoring may be performed only during one DRX wake-up period that follows the WUS; if the WUS is not detected, no channel monitoring may be performed during one DRX wake-up period that follows the WUS.

In an embodiment, the power-saving signal is a WUS; the specified occurrence is an integer N greater than 1, which indicates that the WUS is effective for all N consecutive DRX wake-up periods that follow the WUS; when step 430 is performed, within the specified effective time range, if the WUS is detected, channel monitoring may be performed during all N consecutive DRX wake-up periods that follow the WUS; if the WUS is not detected, no channel monitoring may be performed during all N consecutive DRX wake-up periods that follow the WUS.

It can be seen from the above embodiment that first notification information sent by a base station is received. The first notification information includes a specified occurrence of a power-saving signal and a specified effective time range of the specified occurrence configured by the base station for the terminal, and the specified occurrence represents a specified effective range of the power-saving signal for subsequent DRX. The specified occurrence and the specified effective time range are acquired from the first notification information. Channel monitoring is performed according to the specified occurrence and the specified effective time range. In this way, coordinated operation of a power-saving signal pattern and a DRX pattern is realized. If there is data, the terminal may monitor intensively according to the specified occurrence; if there is no data, the terminal may monitor sparsely according to the specified occurrence, thereby improving efficiency of channel monitoring and also avoids resource waste.

Figure 5:
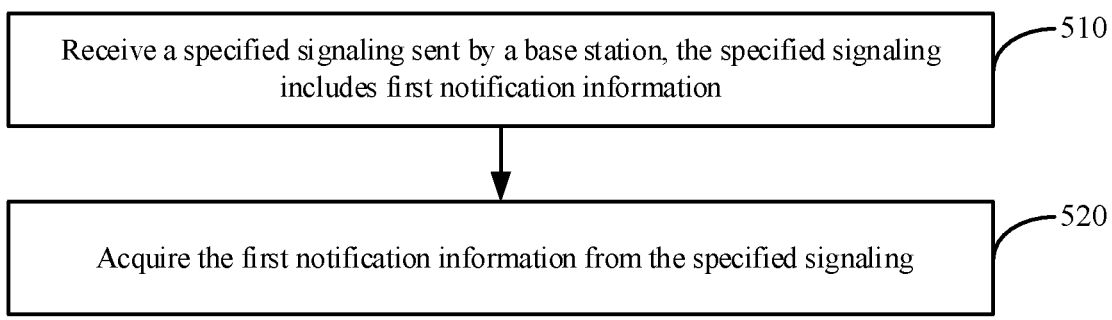
FIG. 5 is a flowchart illustrating another channel monitoring method according to an exemplary embodiment.

FIG. 5 is a flowchart illustrating another channel monitoring method according to an exemplary embodiment, and the channel monitoring method can be applied to a terminal. On the basis of the method shown in FIG. 4, as shown in FIG. 5, step 410, when performed, may include following steps 510 and 520.

At step 510, a specified signaling sent by a base station is received, the specified signaling includes first notification information.

In an embodiment, the specified signaling in the above (5-1) may include, but is not limited to, at least one of:
 (5-1) a DCI signaling;
 (5-2) an RAR signaling in a random access process;
 (5-3) a CR signaling in a random access process;
 (5-4) an RRC signaling; or
 (5-5) an MAC CE signaling.

At step 520, the first notification information is acquired from the specified signaling.

It can be seen from the above embodiment that a specified signaling sent by the base station is received, the specified signaling includes first notification information, and the first notification information is acquired from the specified signaling, thereby improving the accuracy of notification information transmission.

Figure 6:
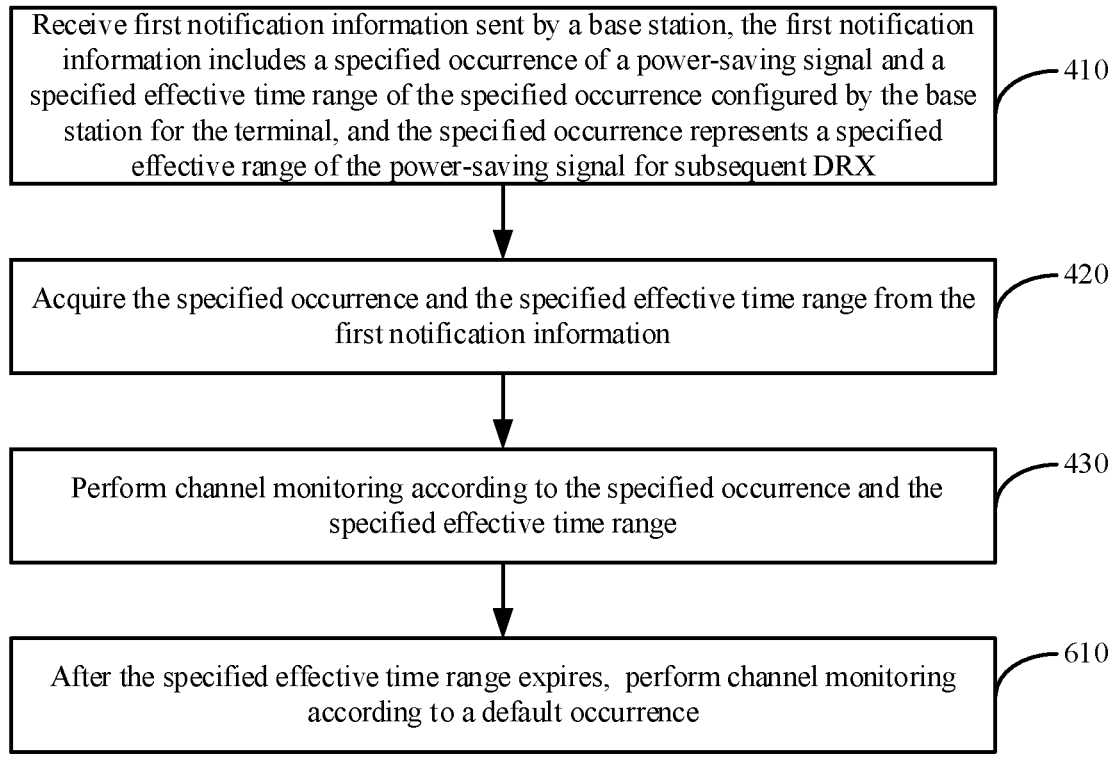
FIG. 6 is a flowchart illustrating a channel monitoring method according to an exemplary embodiment.

FIG. 6 is a flowchart illustrating another channel monitoring method according to an exemplary embodiment, and the channel monitoring method can be applied to a terminal. On the basis of the method shown in FIG. 4, as shown in FIG. 6, the channel monitoring method may further include the following step 610.

At step 610, after the specified effective time range expires, channel monitoring is performed according to a default occurrence.

In an embodiment, the default occurrence at step 610 may be sent by the base station to the terminal through a system message or an RRC message, or may be specified by a communication protocol.

It can be seen from the above embodiment that after the specified effective time range expires, channel monitoring can be performed according to the default occurrence, thereby enriching implementation of channel monitoring, and also improving reliability and utility of channel monitoring.

Corresponding to the above embodiments of channel monitoring methods, the present disclosure also provides embodiments of channel monitoring apparatuses. In addition, for parts that are not described in detail in the embodiments of channel monitoring apparatuses, reference may be made to the embodiments of corresponding channel monitoring methods.

Figure 7:
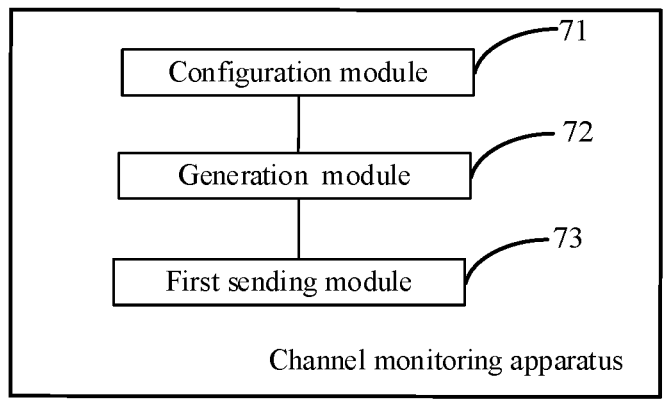
FIG. 7 is a block diagram illustrating a channel monitoring apparatus according to an exemplary embodiment.

FIG. 7 is a block diagram illustrating a channel monitoring apparatus according to an exemplary embodiment. The apparatus is applied to a base station and used to perform the channel monitoring method shown in FIG. 1. As shown in FIG. 7, the channel monitoring apparatus may include:
 a configuration module 71, configured to configure a specified occurrence of a power-saving signal and a specified effective time range of the specified occurrence for a terminal, the specified occurrence representing a specified effective range of the power-saving signal for subsequent discontinuous reception (DRX);
 a generation module 72, configured to generate first notification information, the first notification information including the specified occurrence and the specified effective time range; and
 a first sending module 73, configured to send the first notification information to the terminal, so that the terminal acquires the specified occurrence and the specified effective time range from the first notification information, and performs channel monitoring according to the specified occurrence and the specified effective time range.

In an embodiment, on the basis of the apparatus shown in FIG. 7, the power-saving signal is a wake up signaling (WUS); and the specified occurrence is 0, which indicates that a WUS monitoring pattern is ignored and only a DRX pattern is used.

In an embodiment, on the basis of the apparatus shown in FIG. 7, the power-saving signal is a wake up signaling (WUS); and the specified occurrence is 1, which indicates that the WUS is only effective for one DRX wake-up period that follows the WUS.

In an embodiment, on the basis of the apparatus shown in FIG. 7, the power-saving signal is a wake up signaling (WUS); and the specified occurrence is an integer N greater than 1, which indicates that the WUS is effective for all N consecutive DRX wake-up periods that follow the WUS.

In an embodiment, on the basis of the apparatus shown in FIG. 7, the specified effective time range may include, but is not limited to, at least one of:
 absolute time T;
 a DRX short cycle period;
 a first multiple of the DRX short cycle period;
 a second multiple of a DRX long cycle period; or
 until next time second notification information is received from a network, the second notification information including another specified occurrence and another specified effective time range configured by the base station for the terminal.

Figure 8:
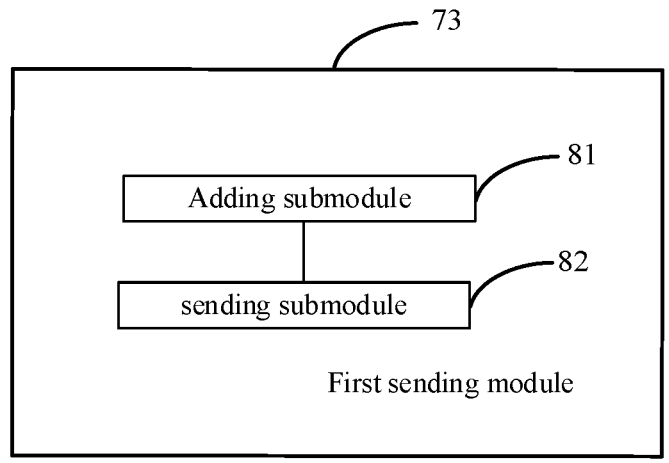
FIG. 8 is a block diagram illustrating another channel monitoring apparatus according to an exemplary embodiment.

In an embodiment, on the basis of the apparatus shown in FIG. 7, as shown in FIG. 8, the first sending module 73 may include:
 an adding submodule 81, configured to add the first notification information to a specified signaling; and
 a sending submodule 82, configured to send the specified signaling to the terminal, so that the terminal acquires the first notification information from the specified signaling.

In an embodiment, on the basis of the apparatus shown in FIG. 8, the specified signaling may include, but is not limited to, at least one of:
 a DCI signaling;
 an RAR signaling in a random access process;
 a CR signaling in a random access process;
 an RRC signaling; or
 an MAC CE signaling.

It can be seen from the above embodiment that a specified occurrence of a power-saving signal and a specified effective time range of the specified occurrence is configured for a terminal, the specified occurrence representing a specified effective range of the power-saving signal for subsequent DRX; first notification information is generated, the first notification information including the specified occurrence and the specified effective time range; and the first notification information is sent to the terminal. In this way, the terminal can acquire the specified occurrence and the specified effective time range from the first notification information, and perform channel monitoring according to the specified occurrence and the specified effective time range, thereby realizing coordinated operation of a power-saving signal pattern and a DRX pattern. If there is data, a base station can instruct the terminal to monitor intensively, through the specified occurrence; if there is no data, the base station can instruct the terminal to monitor sparsely, through the specified occurrence, which improves efficiency of channel monitoring and also avoids resource waste.

Figure 9:
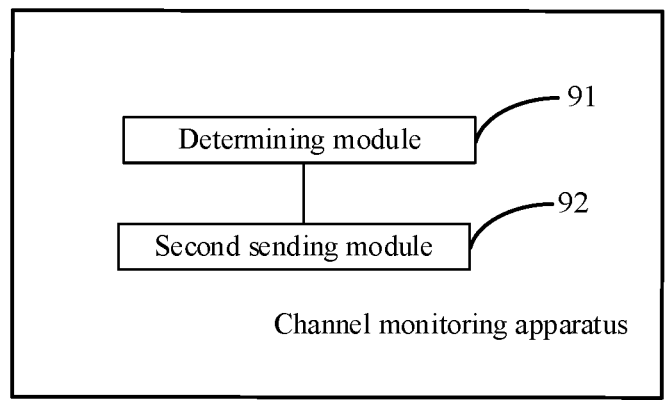
FIG. 9 is a block diagram illustrating another channel monitoring apparatus according to an exemplary embodiment.

In an embodiment, on the basis of the apparatus shown in FIG. 7, as shown in FIG. 9, the apparatus may further include:
 a determining module 91, configured to determine a default occurrence of the power-saving signal, the default occurrence representing a default effective range of the power-saving signal for subsequent discontinuous reception (DRX); and
 a second sending module 92, configured to send the default occurrence to the terminal through a system message or a radio resource control (RRC) message, so that the terminal performs channel monitoring according to the default occurrence after the specified effective time range expires.

In an embodiment, on the basis of the apparatus shown in FIG. 9, the default occurrence is 1 or an integer greater than 1.

It can be seen from the above embodiment that a default occurrence of the power-saving signal is determined, and the default occurrence represents a default effective range of the power-saving signal for subsequent DRX. The default occurrence is sent to the terminal through a system message or an RRC message, so that the terminal may perform channel monitoring according to the default occurrence after the specified effective time range expires. In this way, implementation of channel monitoring is enriched, and reliability and utility of channel monitoring is also improved.

Figure 10:
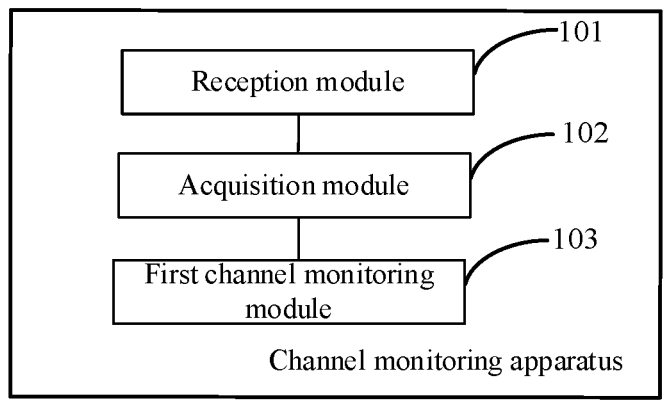
FIG. 10 is a block diagram illustrating a channel monitoring apparatus according to an exemplary embodiment.

FIG. 10 is a block diagram illustrating a channel monitoring apparatus according to an exemplary embodiment. The apparatus is applied to a terminal and used to perform the channel monitoring method shown in FIG. 4. As shown in FIG. 10, the channel monitoring apparatus may include:
 a reception module 101, configured to receive first notification information sent by a base station, the first notification information including a specified occurrence of a power-saving signal and a specified effective time range of the specified occurrence configured by the base station for the terminal, and the specified occurrence representing a specified effective range of the power-saving signal for subsequent discontinuous reception (DRX);
 an acquisition module 102, configured to acquire the specified occurrence and the specified effective time range from the first notification information; and
 a first channel monitoring module 103, configured to perform channel monitoring according to the specified occurrence and the specified effective time range.

Figure 11:
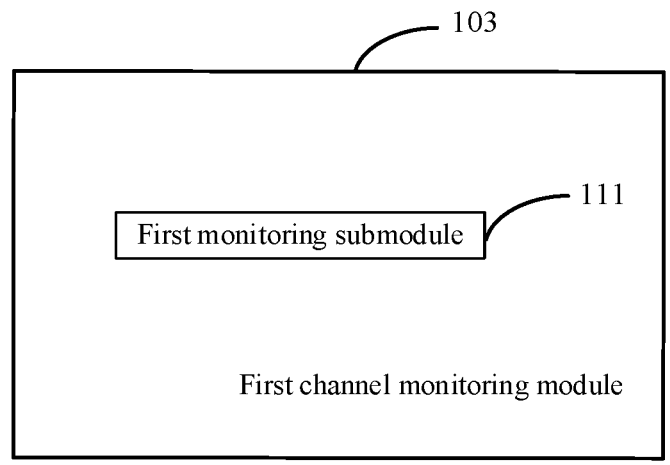
FIG. 11 is a block diagram illustrating another channel monitoring apparatus according to an exemplary embodiment.

In an embodiment, on the basis of the apparatus shown in FIG. 10, as shown in FIG. 11, the power-saving signal is a wake up signaling (WUS); the specified occurrence is 0, which indicates that a WUS monitoring pattern is ignored and only a DRX pattern is used;
 The first channel monitoring module 103 may include:
 a first monitoring submodule 111, configured to, within the specified effective time range, ignore a WUS monitoring pattern and use only a DRX pattern.

Figure 12:
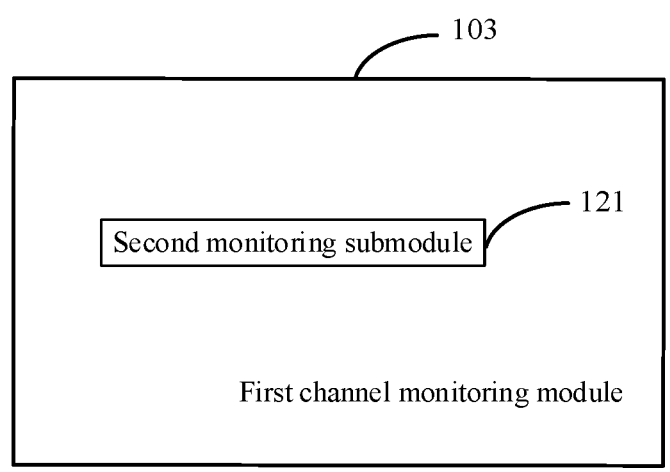
FIG. 12 is a block diagram illustrating another channel monitoring apparatus according to an exemplary embodiment.

In an embodiment, on the basis of the apparatus shown in FIG. 10, as shown in FIG. 12, the power-saving signal is a wake up signaling (WUS); the specified occurrence is 1, which indicates that the WUS is only effective for one DRX wake-up period that follows the WUS;
 The first channel monitoring module 103 may include:
 a second monitoring submodule 121, configured to, within the specified effective time range, in response to that the WUS is detected, perform channel monitoring only during one DRX wake-up period that follows the WUS; in response to that the WUS is not detected, perform no channel monitoring during one DRX wake-up period that follows the WUS.

Figure 13:
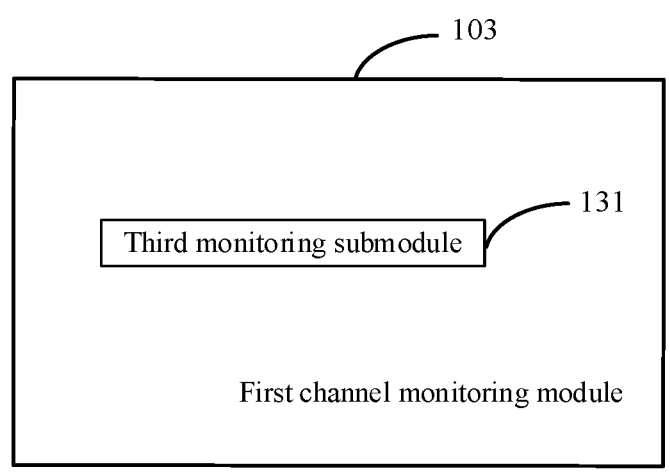
FIG. 13 is a block diagram illustrating another channel monitoring apparatus according to an exemplary embodiment.

In an embodiment, on the basis of the apparatus shown in FIG. 10, as shown in FIG. 13, the power-saving signal is a wake up signaling (WUS); the specified occurrence is an integer N greater than 1, which indicates that the WUS is effective for all N consecutive DRX wake-up periods that follow the WUS;

The first channel monitoring module 103 may include:
a third monitoring submodule 131, configured to, within the specified effective time range, in response to that the WUS is detected, perform channel monitoring during all N consecutive DRX wake-up periods that follow the WUS; in response to that the WUS is not detected, perform no channel monitoring during all N consecutive DRX wake-up periods that follow the WUS.

In an embodiment, on the basis of any of the apparatuses shown in FIG. 10 to FIG. 13, the specified effective time range may include, but is not limited to, at least one of:
absolute time T;
a DRX short cycle period;
a first multiple of the DRX short cycle period;
a second multiple of a DRX long cycle period; or
until next time second notification information is received from a network, the second notification information including another specified occurrence and another specified effective time range configured by the base station for the terminal.

It can be seen from the above embodiment that first notification information sent by a base station is received. The first notification information includes a specified occurrence of a power-saving signal and a specified effective time range of the specified occurrence configured by the base station for the terminal, and the specified occurrence represents a specified effective range of the power-saving signal for subsequent DRX. The specified occurrence and the specified effective time range are acquired from the first notification information. Channel monitoring is performed according to the specified occurrence and the specified effective time range. In this way, coordinated operation of a power-saving signal pattern and a DRX pattern is realized. If there is data, the terminal may monitor intensively according to the specified occurrence; if there is no data, the terminal may monitor sparsely according to the specified occurrence, thereby improving efficiency of channel monitoring and also avoids resource waste.

Figure 14:
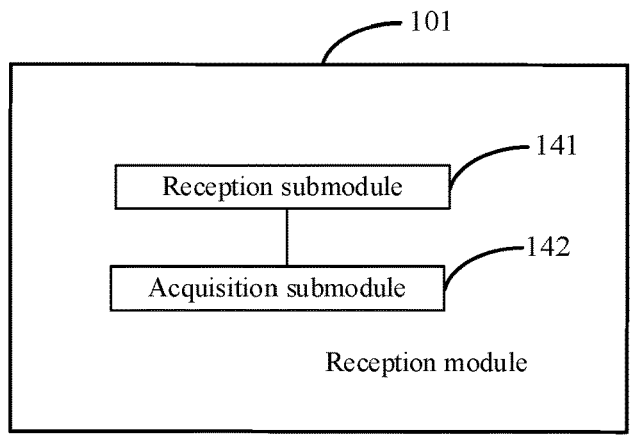
FIG. 14 is a block diagram illustrating another channel monitoring apparatus according to an exemplary embodiment.

In an embodiment, on the basis of the apparatus shown in FIG. 10, as shown in FIG. 14, the reception module 101 may include:
a reception submodule 141, configured to receive a specified signaling sent by the base station, the specified signaling including the first notification information; and
an acquisition submodule 142, configured to acquire the first notification information from the specified signaling.

In an embodiment, on the basis of the apparatus shown in FIG. 14, the specified signaling may include, but is not limited to, at least one of the following:
a DCI signaling;
an RAR signaling in a random access process;
a CR signaling in a random access process;
an RRC signaling; or
an MAC CE signaling.

It can be seen from the above embodiment that a specified signaling sent by the base station is received, the specified signaling includes first notification information, and the first notification information is acquired from the specified signaling, thereby improving the accuracy of notification information transmission.

Figure 15:
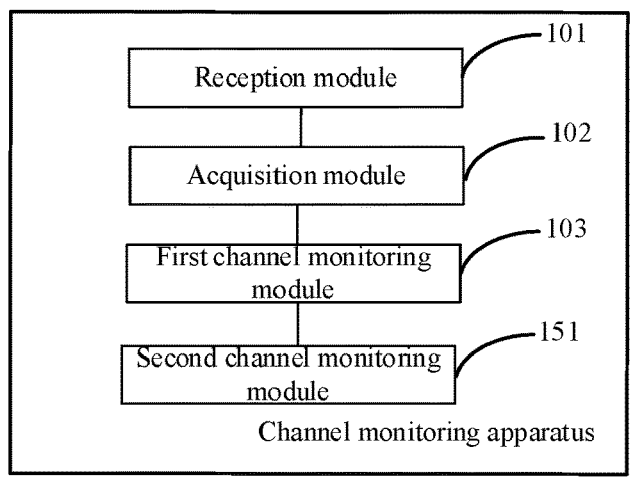
FIG. 15 is a block diagram illustrating another channel monitoring apparatus according to an exemplary embodiment.

In an embodiment, on the basis of the apparatus shown in FIG. 10, as shown in FIG. 15, the apparatus may further include:
a second channel monitoring module 151, configured to, after the specified effective time range expires, perform channel monitoring according to a default occurrence.

In an embodiment, on the basis of the apparatus shown in FIG. 15, the default occurrence is sent by the base station to the terminal through a system message or an RRC message, or specified by a communication protocol.

It can be seen from the above embodiment that after the specified effective time range expires, channel monitoring can be performed according to the default occurrence, thereby enriching implementation of channel monitoring, and also improving reliability and utility of channel monitoring.

For the apparatus embodiment, since the apparatus substantially corresponds to the method embodiment, reference may be made to some description of the method embodiment. The apparatus embodiments described above are merely schematic, in which the units described as separate components may or may not be physically separated, and the components displayed as units may or may not be physical units, may be located in one place, or may be distributed to a plurality of network units. Some or all of the modules may be selected according to actual needs to achieve the solution of the present disclosure, which a person of ordinary skill in the art would understand and implement without creative efforts.

The present disclosure provides a non-transitory computer readable storage medium storing computer programs, where the computer programs are used to perform the channel monitoring method according to any of FIG. 1 to FIG. 3.

The present disclosure provides a non-transitory computer readable storage medium storing computer programs, where the computer programs are used to perform the channel monitoring method according to any one of FIG. 4 to FIG. 6.

Correspondingly, the present disclosure also provides a channel monitoring apparatus applied to a base station, including:
processor; and
a memory for instructions executable by the processor;
where the processor is configured to:
configure a specified occurrence of a power-saving signal and a specified effective time range of the specified occurrence for a terminal, the specified occurrence representing a specified effective range of the power-saving signal for subsequent discontinuous reception (DRX);
generate first notification information, the first notification information including the specified occurrence and the specified effective time range; and
send the first notification information to the terminal, so that the terminal acquires the specified occurrence and the specified effective time range from the first notification information, and performs channel monitoring according to the specified occurrence and the specified effective time range.

Figure 16:
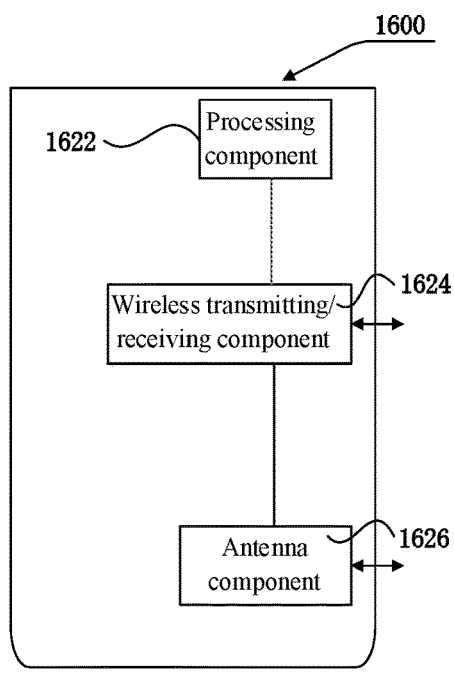
FIG. 16 is a schematic structural diagram illustrating a channel monitoring apparatus according to an exemplary embodiment.

As shown in FIG. 16, FIG. 16 is a schematic structural diagram illustrating a resource configuration apparatus according to an example. The apparatus 1600 may be provided as a base station. As shown in FIG. 16, the apparatus 1600 includes a processing component 1622, a wireless transmitting/receiving component 1624, an antenna component 1626 and a signal processing portion specific to a wireless interface. The processing component 1622 may further include one or more processors.

One of the processors in the processing component 1622 may be configured to perform any of the above resource configuration methods.

The present disclosure further provides a resource configuration apparatus applied to a terminal, including:

a processor; and a memory for storing instructions executable by the processor, where the processor is configured to:

receive first notification information sent by a base station, the first notification information including a specified occurrence of a power-saving signal and a specified effective time range of the specified occurrence configured by the base station for the terminal, and the specified occurrence representing a specified effective range of the power-saving signal for subsequent discontinuous reception (DRX);

acquire the specified occurrence and the specified effective time range from the first notification information; and perform channel monitoring according to the specified occurrence and the specified effective time range.

Figure 17:
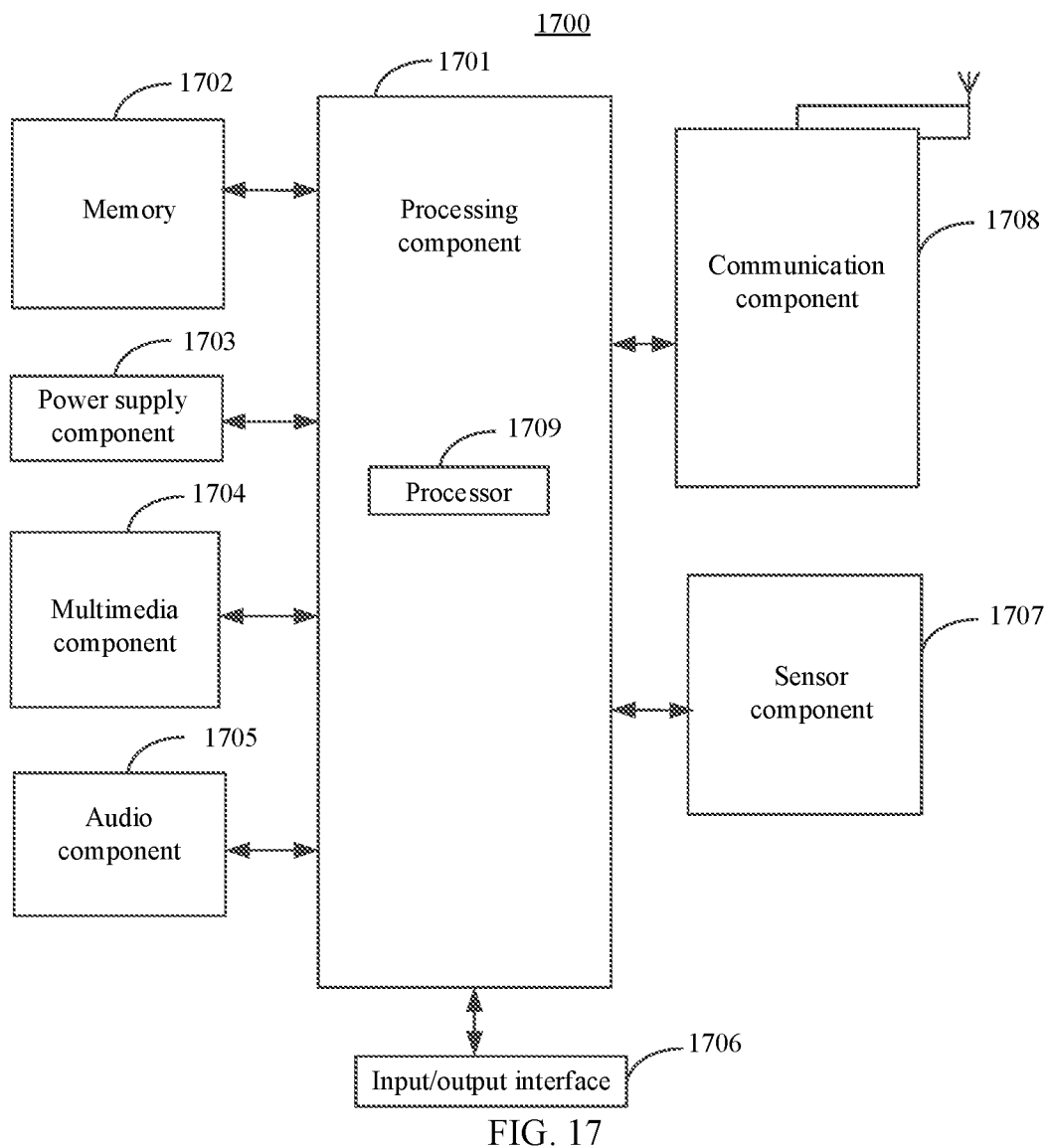
FIG. 17 is a schematic structural diagram of a channel monitoring apparatus according to an exemplary embodiment.

FIG. 17 is a schematic structural diagram illustrating a resource configuration apparatus according to an example. According to an example, a resource configuration apparatus 1700 may be a terminal such as a computer, a mobile phone, a digital broadcast terminal, a message transceiving device, a game console, a tablet device, a medical equipment, a fitness equipment and a personal digital assistant.

As shown in FIG. 17, the apparatus 1700 may include one or more of the following components: a processing component 1701, a memory 1702, a power supply component 1703, a multimedia component 1704, an audio component 1705, an input/output (I/O) interface 1706, a sensor component 1707 and a communication component 1708.

The processing component 1701 generally controls overall operations of the apparatus 1700, such as operations associated with display, phone calls, data communications, camera operations, and recording operations. The processing component 1701 may include one or more processors 1420 to execute instructions so as to complete all or part of the steps of the above methods. In addition, the processing component 1701 may include one or more modules to facilitate the interaction between the processing component 1701 and other components. For example, the processing component 1701 may include a multimedia module to facilitate the interaction between the multimedia component 1704 and the processing component 1701.

The memory 1702 is configured to store various types of data to support the operation of the apparatus 1700. Examples of such data include instructions for any application or method operated on the apparatus 1700, contact data, phonebook data, messages, pictures, videos, and so on. The memory 1702 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1703 supplies power for different components of the apparatus 1700. The power supply component 1703 may include a power supply management system, one or more power supplies, and other components associated with generating, managing and distributing power for the apparatus 1700.

The multimedia component 1704 includes a screen providing an output interface between the apparatus 1700 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1704 may include a front camera and/or a rear camera. The front camera and/or rear camera may receive external multimedia data when the apparatus 1700 is in an operating mode, such as a photographing mode or a video mode. Each of the front camera and the rear camera may be a fixed optical lens system or have focal length and optical zooming capability.

The audio component 1705 is to output and/or input an audio signal. For example, the audio component 1705 includes a microphone (MIC). When the apparatus 1700 is in an operating mode, such as a call mode, a record mode and a voice recognition mode, the microphone is to receive an external audio signal. The received audio signal may be further stored in the memory 1702 or sent via the communication component 1708. In some examples, the audio component 1705 further includes a speaker for outputting an audio signal.

The I/O interface 1706 provides an interface between the processing component 1701 and a peripheral interface module. The above peripheral interface module may be a keyboard, a click wheel, buttons, or the like. These buttons may include but not limited to, a home button, a volume button, a start button and a lock button.

The sensor component 1707 includes one or more sensors to provide status assessments of various aspects for the apparatus 1700. For example, the sensor component 1707 may detect the on/off status of the apparatus 1700, and relative positioning of the component, for example, the component is a display and a keypad of the apparatus 1700. The sensor component 1707 may also detect a change in position of the apparatus 1700 or a component of the apparatus 1700, a presence or absence of the contact between a user and the apparatus 1700, an orientation or an acceleration/deceleration of the apparatus 1700, and a change in temperature of the apparatus 1700. The sensor component 1707 may include a proximity sensor to detect the presence of a nearby object without any physical contact. The sensor component 1707 may further include an optical sensor, such as a Complementary Metal-Oxide-Semiconductor (CMOS) or Charged Coupled Device (CCD) image sensor which is used in imaging applications. In some examples, the sensor component 1707 may further include an acceleration sensor, a gyroscope sensor, a magnetic sensor, a pressure sensor, or a temperature sensor.

The communication component 1708 is to facilitate wired or wireless communication between the apparatus 1700 and other devices. The apparatus 1700 may access a wireless network based on a communication standard, such as Wi-Fi, 2G or 3G, or a combination thereof. In an example, the communication component 1708 receives a broadcast signal or broadcast related information from an external broadcast management system via a broadcast channel. In an example, the communication component 1708 may further include a Near Field Communication (NFC) module for promoting short-range communication. For example, the NFC module may be implemented based on a radio occurrence identification (RFID) technology, an infrared data association (IrDA) technology, an ultra-wideband (UWB) technology, a Bluetooth (BT) technology and other technologies.

In an example, the apparatus 1700 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 1702 including instructions. The above instructions may be executed by the processor 1709 of the apparatus 1700 to complete the above method. For example, the non-transitory computer readable storage medium may be a Read-Only Memory (ROM), a Random-Access Memory (RAM), a CD-ROM, a magnetic tape, a floppy disk, an optical data storage device, and the like.

The instructions in the storage medium, when executed by the processor, cause apparatus 1700 to perform any of the above channel monitoring methods.

After considering the specification and practicing the present disclosure, the persons skilled in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only and the real scope and spirit of the present disclosure are indicated by the claims of the present disclosure.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A channel monitoring method performed by a base station, comprising:
    configuring a specified occurrence of a power-saving signal and a specified effective time range of the specified occurrence for a terminal, the specified occurrence representing a specified effective range of the power-saving signal for subsequent discontinuous reception (DRX);
    generating first notification information, the first notification information comprising the specified occurrence and the specified effective time range; and
    sending the first notification information to the terminal, so that the terminal acquires the specified occurrence and the specified effective time range from the first notification information, and performs channel monitoring according to the specified occurrence and the specified effective time range;
    wherein
    the power-saving signal is a wake up signaling (WUS);
    the specified occurrence comprises 0, 1, and an integer N greater than 1; and
    when the specified occurrence is 0, a WUS monitoring pattern is ignored and only a DRX pattern is used.

2. The method according to claim 1, wherein
    the specified occurrence is 1, which indicates that the WUS is only effective for one DRX wake-up period that follows the WUS.

3. The method according to claim 1, wherein
    the specified occurrence is an integer N greater than 1, which indicates that the WUS is effective for all N consecutive DRX wake-up periods that follow the WUS.

4. The method according to claim 1, wherein the specified effective time range comprises at least one of:
    absolute time T;
    a DRX short cycle period;
    a first multiple of the DRX short cycle period;
    a second multiple of a DRX long cycle period; or
    until next time second notification information is received from a network, the second notification information comprising another specified occurrence and another specified effective time range configured by the base station for the terminal.

5. The method according to claim 1, wherein the sending the first notification information to the terminal comprises:
    adding the first notification information to a specified signaling; and
    sending the specified signaling to the terminal, so that the terminal acquires the first notification information from the specified signaling.

6. The method according to claim 5, wherein the specified signaling comprises at least one of:
    a downlink control information (DCI) signaling;
    a random access response (RAR) signaling in a random access process;
    a contention resolution (CR) signaling in a random access process;
    a radio resource control (RRC) signaling; or
    a media access control address control element (MAC CE) signaling.

7. The method according to claim 1, further comprising:
    determining a default occurrence of the power-saving signal, the default occurrence representing a default effective range of the power-saving signal for subsequent discontinuous reception (DRX); and
    sending the default occurrence to the terminal through a system message or a radio resource control (RRC) message, so that the terminal performs channel monitoring according to the default occurrence after the specified effective time range expires.

8. The method according to claim 7, wherein the default occurrence is 1 or an integer greater than 1.

9. A channel monitoring method performed by a terminal, comprising:
    receiving first notification information sent by a base station, the first notification information comprising a specified occurrence of a power-saving signal and a specified effective time range of the specified occurrence configured by the base station for the terminal, and the specified occurrence representing a specified effective range of the power-saving signal for subsequent discontinuous reception (DRX);
    acquiring the specified occurrence and the specified effective time range from the first notification information; and performing channel monitoring according to the specified occurrence and the specified effective time range,
wherein
the power-saving signal is a wake up signaling (WUS);
the specified occurrence comprises 0.1, and an integer N greater than 1; and
when the specified occurrence is 0, a WUS monitoring pattern is ignored and only a DRX pattern is used.

10. The method according to claim 9, wherein
performing the channel monitoring according to the specified occurrence and the specified effective time range comprises:
within the specified effective time range, ignoring a WUS monitoring pattern and using only a DRX pattern.

11. The method according to claim 9, wherein the specified occurrence is 1, which indicates that the WUS is only effective for one DRX wake-up period that follows the WUS; and
performing the channel monitoring according to the specified occurrence and the specified effective time range comprises:
within the specified effective time range, in response to that the WUS is detected, performing channel monitoring only during one DRX wake-up period that follows the WUS; in response to that the WUS is not detected, performing no channel monitoring during one DRX wake-up period that follows the WUS.

12. The method according to claim 9, wherein the specified occurrence is an integer N greater than 1, which indicates that the WUS is effective for all N consecutive DRX wake-up periods that follow the WUS; and
performing the channel monitoring according to the specified occurrence and the specified effective time range comprises:
within the specified effective time range, in response to that the WUS is detected, performing channel monitoring during all N consecutive DRX wake-up periods that follow the WUS; in response to that the WUS is not detected, performing no channel monitoring during all N consecutive DRX wake-up periods that follow the WUS.

13. The method according to claim 9, wherein the specified effective time range comprises at least one of:
absolute time T;
a DRX short cycle period;
a first multiple of the DRX short cycle period;
a second multiple of a DRX long cycle period; or
until next time second notification information is received from a network, the second notification information comprising another specified occurrence and another specified effective time range configured by the base station for the terminal.

14. The method according to claim 9, wherein the receiving the first notification information sent by the base station comprises:
receiving a specified signaling sent by the base station, the specified signaling comprising the first notification information; and
acquiring the first notification information from the specified signaling.

15. The method according to claim 14, wherein the specified signaling comprises at least one of:
a downlink control information (DCI) signaling;
a random access response (RAR) signaling in a random access process;
a contention resolution (CR) signaling in a random access process;
a radio resource control (RRC) signaling; or
a media access control address control element (MAC CE) signaling.

16. The method according to claim 9, further comprising:
after the specified effective time range expires, performing channel monitoring according to a default occurrence.

17. The method according to claim 16, wherein the default occurrence is sent by the base station to the terminal through a system message or a radio resource control (RRC) message, or specified by a communication protocol.

18. A base station, comprising:
a processor; and
a memory for storing instructions executable by the processor,
wherein the processor is configured to:
configure a specified occurrence of a power-saving signal and a specified effective time range of the specified occurrence for a terminal, the specified occurrence representing a specified effective range of the power-saving signal for subsequent discontinuous reception (DRX);
generate first notification information, the first notification information comprising the specified occurrence and the specified effective time range; and
send the first notification information to the terminal, so that the terminal acquires the specified occurrence and the specified effective time range from the first notification information, and performs channel monitoring according to the specified occurrence and the specified effective time range,
wherein
the power-saving signal is a wake up signaling (WUS);
the specified occurrence comprises 0.1, and an integer N greater than 1; and
when the specified occurrence is 0, a WUS monitoring pattern is ignored and only a DRX pattern is used.

19. A channel monitoring apparatus implementing the method according to claim 9, comprising:
a processor; and
a memory for storing instructions executable by the processor,
wherein the processor is configured to:
acquire the specified occurrence and the specified effective time range from the first notification information, and perform the channel monitoring according to the specified occurrence and the specified effective time range, thereby realizing coordinated operation of a power-saving signal pattern and a DRX pattern;
responsive to that there is data, monitor intensively, through the specified occurrence; and
responsive to that there is no data, monitor sparsely, through the specified occurrence, thereby improving efficiency of channel monitoring and reducing resource waste.

* * * * *